United States Patent
Bernal Vilar et al.

(10) Patent No.: US 12,305,777 B2
(45) Date of Patent: May 20, 2025

(54) TWO-WAY BALL VALVE WITH CRYOGENIC SEAT

(71) Applicant: BAC VALVES, S.A., Figueres (ES)

(72) Inventors: Esteve Bernal Vilar, Figueres (ES); Tomas Paradinas Salson, Figueres (ES); Maria Celeste Machado Ferreira Curval, Figueres (ES)

(73) Assignee: BAC VALVES, S.A., Figueres (ES)

( * ) Notice: Subject to any disclaimer, the term of this patent is extended or adjusted under 35 U.S.C. 154(b) by 93 days.

(21) Appl. No.: 18/551,489

(22) PCT Filed: Mar. 25, 2021

(86) PCT No.: PCT/ES2021/070205
§ 371 (c)(1),
(2) Date: Sep. 20, 2023

(87) PCT Pub. No.: WO2022/200641
PCT Pub. Date: Sep. 29, 2022

(65) Prior Publication Data
US 2024/0167572 A1 May 23, 2024

(51) Int. Cl.
*F16K 5/06* (2006.01)
*F16K 5/20* (2006.01)

(52) U.S. Cl.
CPC ............ *F16K 5/0689* (2013.01); *F16K 5/205* (2013.01)

(58) Field of Classification Search
CPC .... F16K 5/0689; F16K 5/0673; F16K 5/0678; F16K 5/205; F16K 5/208
See application file for complete search history.

(56) References Cited

U.S. PATENT DOCUMENTS

| | | | |
|---|---|---|---|
| 8,985,136 B2 * | 3/2015 | Avdjian | F16K 5/0631 |
| | | | 137/315.18 |
| 11,079,034 B2 * | 8/2021 | Mentzel | F16K 5/0668 |
| (Continued) | | | |

FOREIGN PATENT DOCUMENTS

| | | |
|---|---|---|
| CN | 107917230 A | 4/2018 |
| CN | 107940016 A | 4/2018 |
| CN | 108006257 A | 5/2018 |
| (Continued) | | |

OTHER PUBLICATIONS

International Search Report for Corresponding International Application No. PCT/ES2021/070205, Oct. 1, 2021 and English Translation, 9 pages.

*Primary Examiner* — Michael R Reid
(74) *Attorney, Agent, or Firm* — LUCAS & MERCANTI, LLP

(57) ABSTRACT

A two-way ball valve with cryogenic seat having a valve body (1) with inlet and outlet channels (2, 2'); a ball (3) with a through-hole (3.1); and at least one closing seat (4) in one of the channels (2, 2') with a closing sealing gasket (5) against the wall (6) of the inner cavity where the ball (3) is arranged, the gasket (5) is in contact with the ball (3), the first end (5.2) having a first annular lip (5.21) in contact with the wall (6) through a first spring (8.1) to close the fluid passage from the first channel (2), and the second end having a second annular lip (5.31) in contact with the wall (6) through a second spring (8.2) to close the fluid passage from the second channel (2').

7 Claims, 5 Drawing Sheets

(56) References Cited

U.S. PATENT DOCUMENTS 11,448,321 B2 * 9/2022 Kustermans ............ F16J 15/104
2020/0386324 A1 * 12/2020 Bach Cantenys ..... F16K 5/0689

FOREIGN PATENT DOCUMENTS

| EP | 3343076 A1 | 7/2018 |
| ES | 448411 A1 | 11/1977 |
| JP | 2004293724 A | 10/2004 |
| WO | 2018122435 A1 | 7/2018 |

* cited by examiner

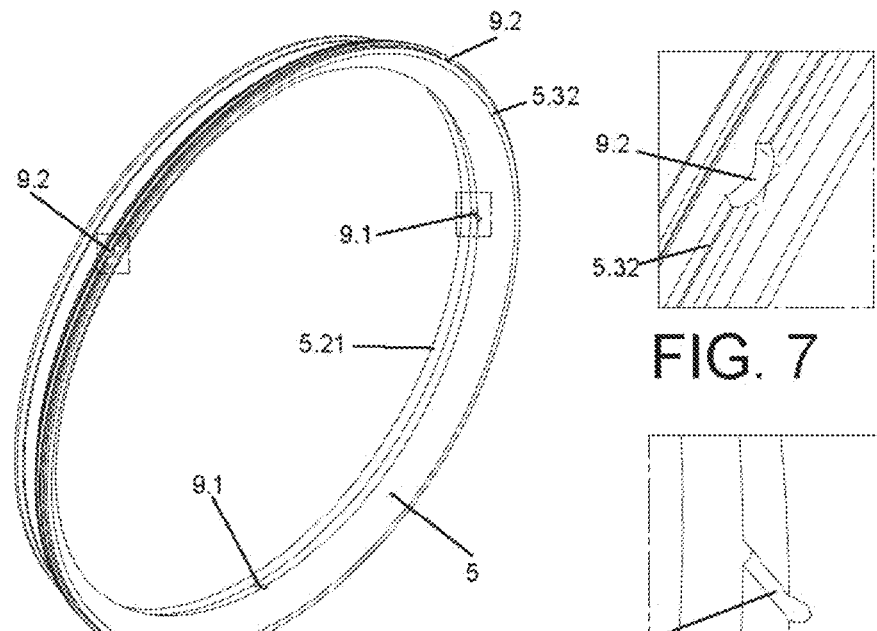
FIG. 6
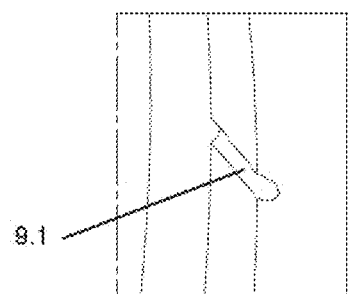
FIG. 7
FIG. 8
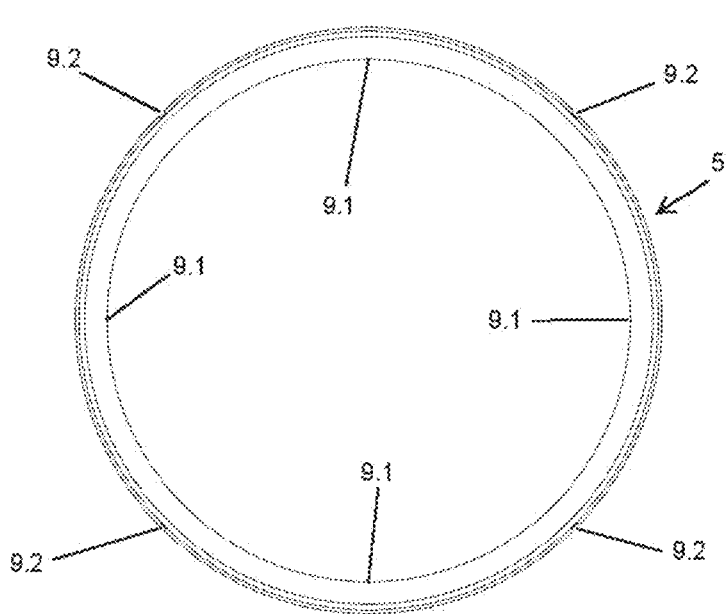
FIG. 9

TWO-WAY BALL VALVE WITH CRYOGENIC SEAT

CROSS REFERENCE TO RELATED APPLICATION

This Application is a 371 of PCT/ES2021/070205, filed on Mar. 25, 2021 which is incorporated herein by reference.

TECHNICAL FIELD

The present invention relates to ball valves used in fluid pipelines, more specifically with valves that operate in conditions of cryogenic temperatures, proposing a valve that allows to effectively obtain perfect sealing conditions in two-way use conditions of the valve.

STATE OF THE ART

In fluid pipelines, the use of ball valves is common, said ball valves comprising a ball provided with a hole passing through it and tightly arranged in an inner cavity of the valve body corresponding spherically with said ball between an inlet duct and outlet duct of the valve, so that by turning the ball the passage of fluid between the aforementioned inlet and outlet ducts of the valve can be interrupted and established.

To establish a seal between the ball and the wall of the inner cavity of the valve where it is arranged that ensures the perfect function of the valve, it is conventionally arranged around the inner mouth of each of the inlet and outlet ducts of the valve, between the wall of the ball housing and the ball surface, a closing seat formed by a gasket made of elastic material in order to achieve an adaptation to possible irregularities in the shape of the ball and thus prevent leaks in the valves.

However, at very low temperatures the elastic materials of the gaskets harden and lose the elasticity necessary to adapt to irregularities of the valve ball, while at these low temperatures the balls can deform and become oval or irregular because the contraction of the metallic material is not linear or due to the dissimilarity of materials between the ball, valve body and elastic material which all have different mechanical characteristics and contraction/expansion coefficients.

Therefore, in applications with cryogenic temperatures (between −29° C. and −196°) C. of conventional ball valves, the closing seats between the rotating ball and the wall of the corresponding inner cavity lose their tightness, producing leaks, for which reason said valves are not efficient at those temperatures.

There are known solutions in which the sealing gasket is inserted into a housing in the wall of the inner cavity where the ball is arranged and with a part projecting from said housing to contact the ball. Said sealing gasket is pressed by a set of springs against the surface of the ball, establishing a seal when, due to changes in temperature or deformations, the tight seal is not ensured.

However, while this solution ensures contact between the sealing gasket and the ball, it has been found that at cryogenic temperatures, the fluid can leak through the contact between the sealing gasket and the inner cavity, that is, at the contact of the sealing gasket with the wall of the housing where said sealing gasket is inserted.

To solve said problem, European patent application EP16380039.4 of the same applicant of the present invention discloses a ball valve with a closing seat in which the sealing gasket comprises an annular lip that is retained in the housing the sealing gasket and contacting the valve body by the pressure exerted by a spring. Both the contact of the sealing gasket with the ball and the contact of the sealing gasket with the valve body are thereby ensured, providing the required tight seal.

However, when said ball valve is two-way, it is essential to position a closing seat in the inner mouth of both inlet and outlet ducts of the valve, since the previous solution is not effective when the fluid flow is directed in the other direction of flow. However, the problem arises that it is possible that during the proper operation of the valve while it is working, from open to closed, fluid becomes trapped in the inner cavity between both closing seats. In this case, the increase in pressure due to operating at cryogenic temperatures creates an overpressure in said cavity for which the solution described above would not be effective in retaining said pressure.

In view of the described drawbacks or limitations presented by the currently existing solutions, a solution is necessary that allows a tight seal in both directions of fluid flow for two-way valves, as well as the elimination of the possibility of an eventual overpressure in the cavity of the valve, and it is only necessary to have a closing seat in at least one of the mouths of the inlet and outlet ducts of the ball valve.

OBJECT OF THE INVENTION

In order to meet this objective and solve the technical problems discussed thus far, in addition to providing additional advantages that can be derived later, the present invention provides a two-way ball valve with a cryogenic seat, comprising:

- a valve body with a first fluid inlet duct and a second fluid outlet duct;
- a ball with a through hole arranged in an inner cavity of the valve body between the inlet/outlet ducts, the ball being able to rotate between a position connecting the through hole to the inlet/outlet ducts and a position wherein it interrupts the passage between said inlet/outlet ducts;
- a closing seat arranged in the first duct and/or in the second duct, comprising a sealing gasket inserted in a housing defined in a wall of the inner cavity where the ball is arranged, the sealing gasket comprising:
- an intermediate part projecting from the housing and contacting the ball to close the passage of fluid through the contact between the sealing gasket and the ball;
- a first end that defines a first chamber of the housing between the wall and said first end, where there is arranged a first spring of the closing seat that presses a first annular lip of the first end of the sealing gasket against the wall to close the passage of fluid at the contact between the gasket and the wall, establishing a passage of fluid from the first duct to the first chamber of the housing only between the wall of the inner cavity of the valve body and the sealing gasket;
- wherein the sealing gasket comprises a second end that defines a second chamber of the housing, between the wall and said second end, there being arranged in said second chamber a second spring of the closing seat that presses a second annular lip of the second end of the gasket against the wall so that the passage of fluid is closed at the contact between the gasket and the wall from the second duct, there being a passage of fluid from the second duct to the second chamber only between the wall of the inner cavity of the valve body and sealing gasket.

Said closing seat is arranged at the contact between the ball and the metal body of the valve, so that thanks to this configuration, only a single seat is necessary to guarantee tightness, therefore obtaining a two-way valve that allows the tight seal of the flow in both directions.

Thanks to this configuration, due to the pressure exerted by the spring against the first annular lip of the gasket, contact between the gasket and the wall of the inner cavity of the valve body is guaranteed. In this way, the existence of a leak of inlet fluid from the first duct to a cavity between the valve body and the ball that defines a leak chamber is prevented. Furthermore, the fluid that penetrates the first chamber of the housing exerts a certain additional pressure with respect to that of the spring against the first annular lip, said pressure exerted by the fluid reinforcing both the contact between the gasket and the inner wall of the valve body and the contact between the gasket and the ball.

Additionally, the second annular lip of the gasket, comprised on the other side of the intermediate area of the gasket for contacting the ball opposite the first end of the gasket, guarantees contact between the gasket and the wall of the inner cavity of the valve body, closing the passage of fluid from the second duct when the fluid circulates from the second duct to the first duct. In this case, similarly to what happens in the first chamber, the force exerted by the fluid that penetrates the second chamber exerts some additional pressure on the second lip, reinforcing both the contact of the gasket with the inner wall of the valve body and the contact of the gasket with the ball. The two-way tightness of the ball valve is thereby ensured.

Requiring a single seat to achieve a tight seal with the two-way nature indicated for the ball valve involves an obvious reduction in manufacturing costs and ease of assembly. In addition, overpressure problems that can occur in known solutions in which two closing seats are used and in which fluid can remain trapped in the aforementioned leak chamber between the ball cavity and the ball are avoided. This fluid trapped between both seats can exert overpressure when subjected to cryogenic temperatures that weakens the tightness of the closing seats. The present invention leads to obtaining a cavity-free valve, that is, a valve body free of dead spaces in which fluid can accumulate, since there is only a closing seat in one of the ducts while there is a free passage of fluid in the other duct.

According to one aspect of the invention, the first annular lip of the gasket with a preferably longitudinal configuration is arranged in the direction parallel to the first duct, that is, it extends in a substantially horizontal plane, while the second annular lip of the gasket with a preferably longitudinal configuration is arranged at an angle with respect to said first annular lip, even more preferably perpendicular to the first annular lip, that is, in a substantially vertical manner.

This arrangement allows the pressure exerted by the fluid on the gasket to be greater and the resulting force components to ensure to a greater extent the contact of the lips of the gasket with the inner wall of the valve body and the contact of the gasket with the ball. Accordingly, the tight seal is reinforced for both directions of fluid circulation despite the deformations caused by cryogenic temperatures.

Due to the pressure, deformations and/or contractions due to the cryogenic temperature, it is possible for the gasket to contact the inner wall of the valve body in the passage of fluid from the duct to the first chamber, so as to prevent the continuous passage of fluid to the first chamber. In order to guarantee a permanent passage of fluid from the first duct to said first chamber, the first end of the sealing gasket is intended to comprise at least one inner recess transverse to the gasket that defines a permanent channel for the passage of fluid between the gasket and inner wall of the valve body.

Thanks to this configuration, the fluid continuously penetrates the first chamber from the first duct and the pressure exerted by it exerts force on the first annular lip and on the gasket. The gasket is thereby pressed against the inner wall of the valve body and against the ball, contributing an additional force to the first spring to achieve a tight seal. This does not occur in known ball valves in which, due to the shape of the gasket, there is a circumferential groove for passage of fluid that can be closed with pressure or deformation, the gasket contacting the inner wall of the valve body and preventing that collaborative effort of fluid pressure.

In a similar way to the first chamber, in the second chamber it is possible for the passage of fluid to be closed for the aforementioned reasons. The passage of fluid to said second chamber from the second duct is prevented, so there would be no collaborative effort of the fluid pressure to press the gasket against the inner wall of the valve body and against the ball, which does not ensure correct tightness, where leaks may exist due to the deformations of the materials in cryogenic conditions. In order to allow a continuous passage of fluid to the second chamber from the second duct, the second end of the gasket is intended to comprise at least one outer recess transverse to the gasket that defines a permanent channel for passage of fluid to the second chamber.

The arrangement of said outer recess guarantees the entry of fluid to the second chamber from the second duct when the valve operates in the opposite direction, allowing a tight seal.

According to one aspect of the invention, the second end of the sealing gasket may comprise a third annular lip facing the second annular lip that contacts the wall of the housing and, together with the second annular lip, delimits a housing for the second spring.

This third annular lip of the sealing gasket serves as a seat for the second spring and on the other hand acts as a mechanical stop against the wall of the housing, which limits the bending of the gasket once installed and subjected to the stresses of the fluid pressure and the ball, thereby controlling that displacement due to bending, which could cause the gasket to break, especially at cryogenic temperature, is not excessive.

On the other hand, in anticipation of large valve sizes, said third annular lip, preferably with an inclined section, facilitates insertion since it is done progressively so that, considering the contraction of the material at cryogenic temperature, the dimension of the outer diameter of the third annular lip being greater than the fit of the seat is always maintained, guaranteeing leak-tight seal.

According to one aspect of the invention, the gasket of the ball valve comprises a plurality of inner and outer recesses, preferably four recesses at each end of the gasket.

Even more preferably, said inner and outer recesses are arranged in angularly interspersed positions in the axial direction, the axial direction being that corresponding to the imaginary axis of the gasket coinciding with the direction of the ducts. A better distribution of fluid pressure, and therefore a better seal in the seat between valve body and ball, are thereby produced.

DESCRIPTION OF THE FIGURES

FIG. 6 shows a perspective view of the sealing gasket, where a plurality of interior and outer recesses can be seen in alternating positions axially.

FIG. 7 shows the enlarged detail of the outer recess of the third annular lip of the sealing gasket.

FIG. 8 shows the enlarged detail of the inner recess of the first end of the sealing gasket.

FIG. 9 shows a front view of the sealing gasket.

DETAILED DESCRIPTION OF THE INVENTION

In view of the aforementioned figures, and in accordance with the numbering adopted, it is possible to observe a preferred exemplary embodiment of the invention, which comprises the parts and elements indicated and described in detail below.

Figure 1:
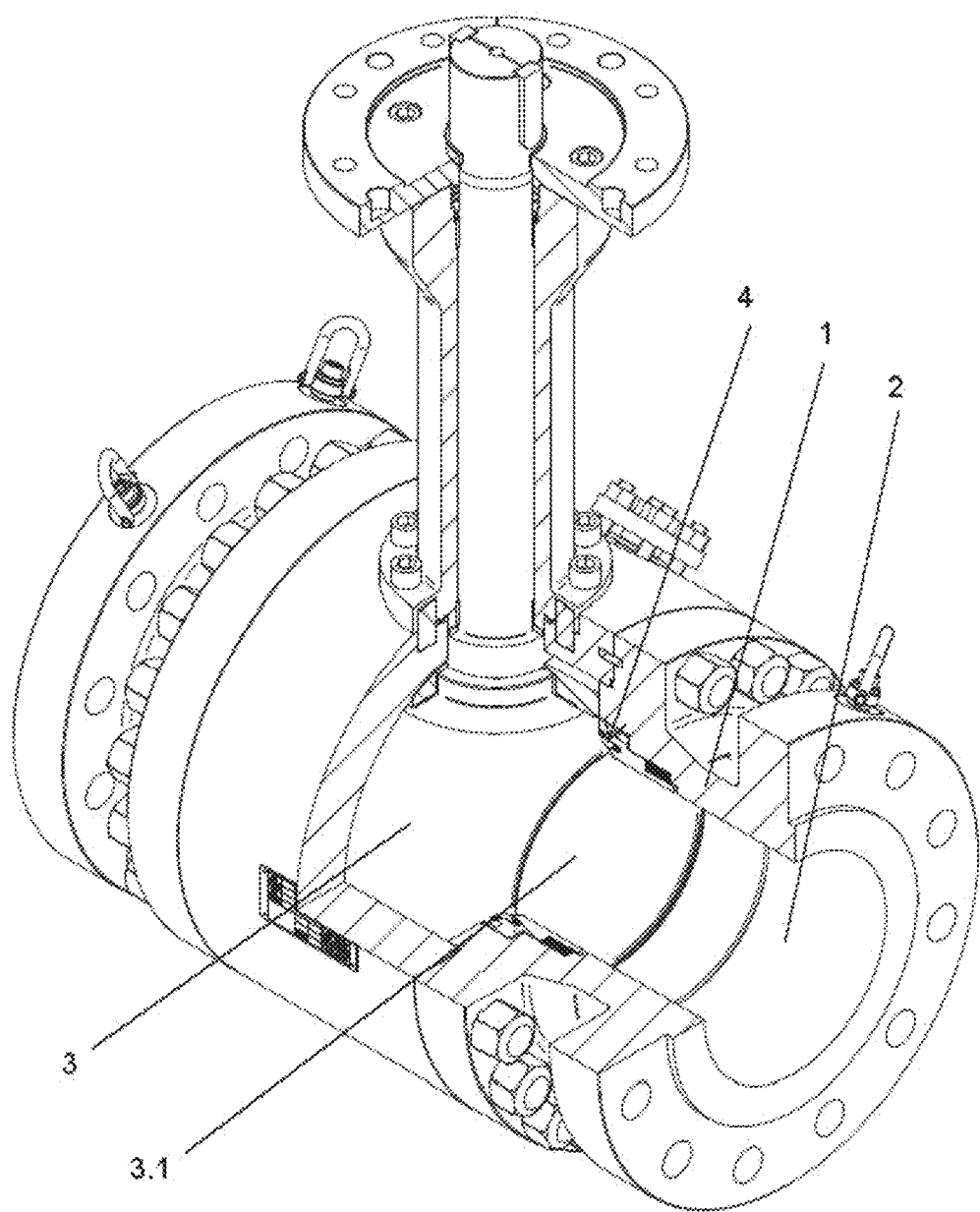
FIG. 1 shows a perspective view of a ball valve object of the invention in which a partial cut has been made to visualize one of the two encounters between the ball and the valve body where the closing seat is located.

FIG. 1 shows a ball valve in which the ball (3) is arranged in an inner cavity of the valve body (1). Said ball (3) is comprised between a first inlet duct (2) and a second outlet duct (2'), said ball valve being two-way, so that the ball (3) can rotate between a position of connecting the ducts (2, 2') thanks to a through hole (3.1) of the ball (3), and a position in which the passage of fluid between said inlet/outlet ducts (2, 2') is interrupted.

Figure 2:
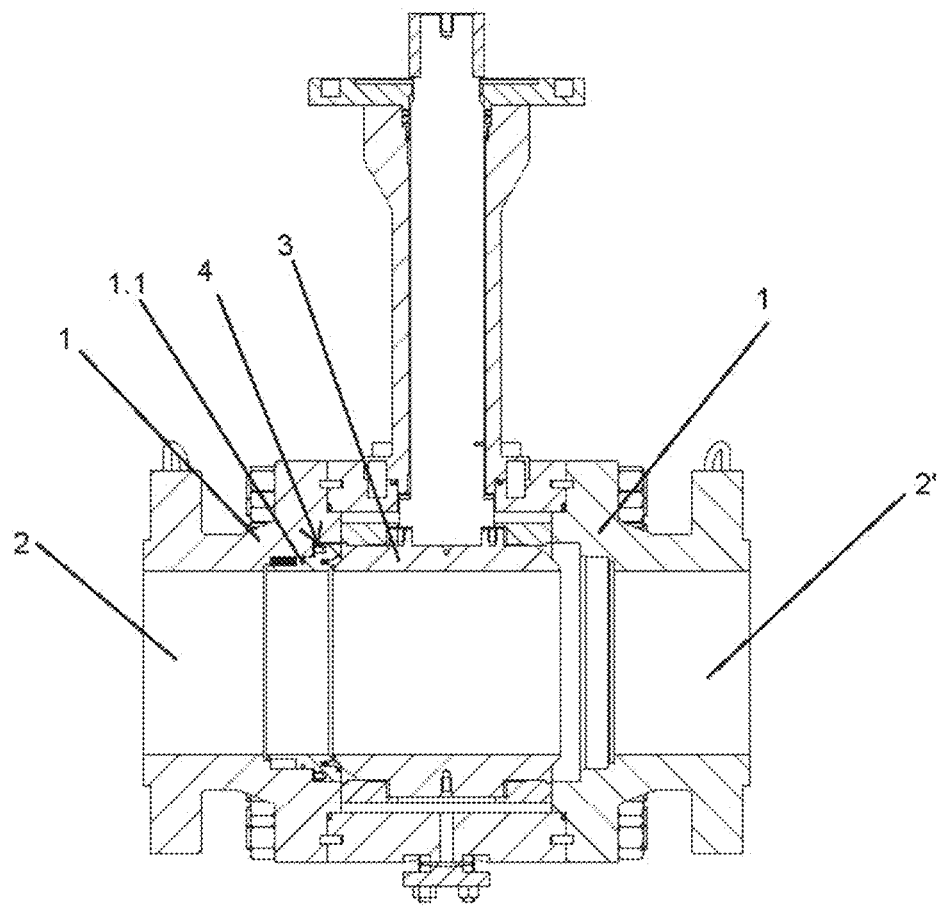
FIG. 2 shows a front section view of the valve where the closing seat can be seen only in the left mouth of the ball valve.

FIG. 2 shows a section of the ball valve, where it can be seen that there is a contact fit between the ball (3) and the inner cavity where the ball (3) is arranged in the left mouth of the duct (2). For the practical exemplary embodiment depicted, only one closing seat (4) is arranged in the left mouth of the duct (2), leaving the other mouth with a free passage of fluid.

Figure 3:
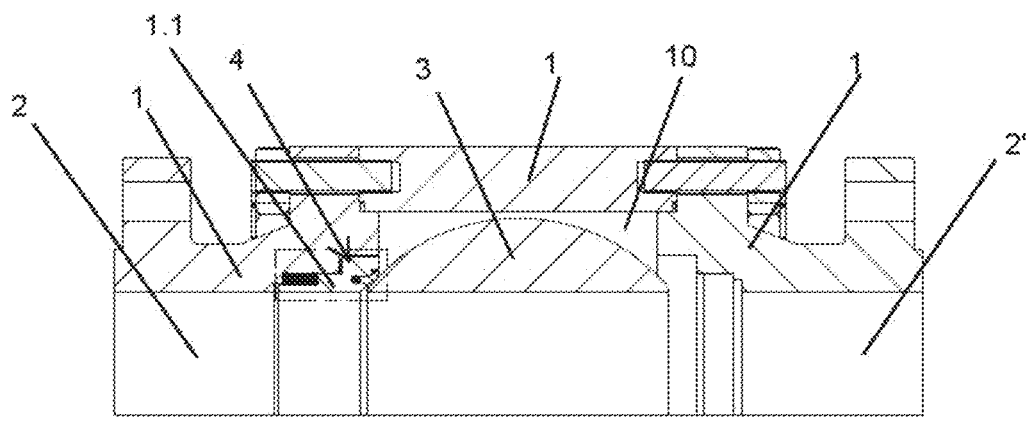
FIG. 3 shows a detail of the ball valve in section where you can see the cavity or leak chamber between the ball and the valve body where the fluid passes when the fluid circulates from the second duct to the first.

Considering that the fluid circulates from left to right, when the direction of flow is reversed, that is, from right to left, the second duct (2') will be the inlet duct, so that, if there is no gasket arranged in the right mouth, fluid leaks into the inner cavity of the valve body that passes through a leak chamber (10), as can be seen in FIG. 3.

FIGS. 4, 5, 6 and 9 show in detail the closing seat (4) object of the invention that guarantees the tight seal of the ball valve in both directions of fluid flow, it only being necessary to have the closing seat (4) in one of the mouths to obtain a completely tight two-way valve.

Figure 4:
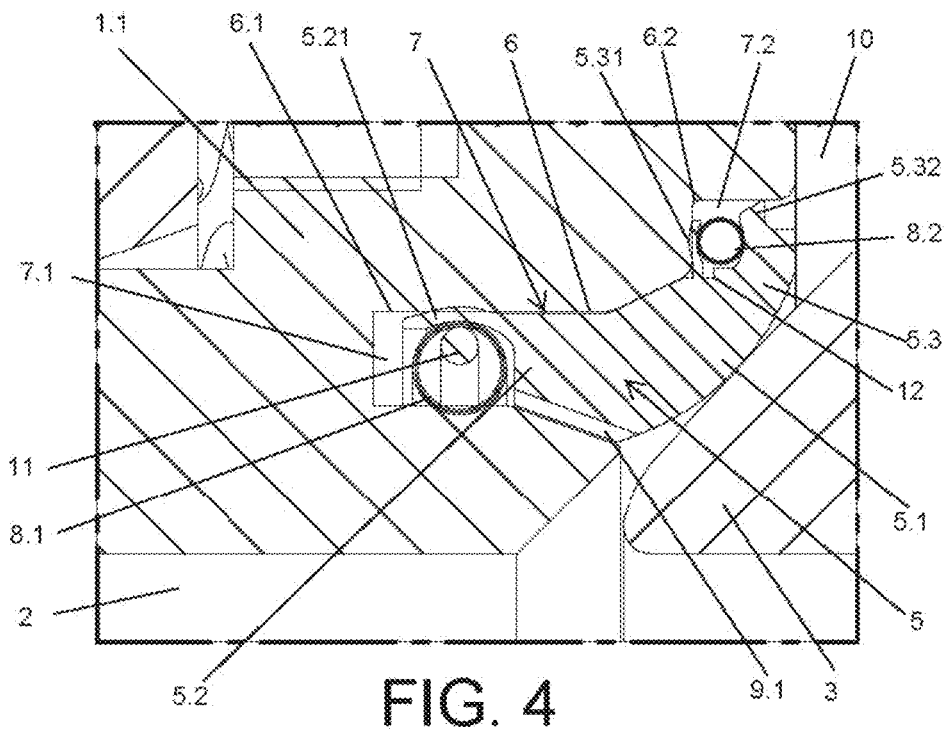
FIG. 4 shows the enlarged detail indicated in the dotted line in FIG. 3, where the cross section of the gasket is displayed through one of the inner recesses of the first end of the gasket.

Thus, as can be seen in FIG. 3, said closing seat (4) indicated at the dotted line is included in the left mouth. FIG. 4 shows said closing seat (4) in detail, consisting of a housing (7) in which a sealing gasket (5) is arranged. Said sealing gasket (5) is fitted in the housing (7), with a first end (5.2) housed in a first chamber (7.1). Said first chamber (7.1) preferably has a rectangular configuration and is arranged parallel to the first duct (2), that is, in a substantially horizontal position, so that a first end (5.2) of the gasket (5) configures a space with the inner wall (6) of the valve body (1) that defines a first chamber (7.1).

In said first chamber (7.1) a first spring (8.1) is arranged between the lower wall of the chamber (7.1) and a first annular lip (5.21) of the first end (5.2) of the sealing gasket (5) that extends longitudinally parallel to the first duct (2). Said first spring (8.1) presses the first annular lip (5.21) against the upper surface of the first chamber (7.1), that is, against the inner wall (6.1) of the valve body (1), so that the contact of the gasket with the valve body is maintained, preventing the passage of fluid.

The sealing gasket (5) comprises an intermediate part (5.1) projecting from the housing (7) and contacting the ball (3).

In this way, with the direction of fluid flow from left to right, the passage of fluid is prevented at the contact between the intermediate part (5.1) of the sealing gasket (5) and the ball (3). And when the fluid passes to the first chamber (7.1) from the first duct (2), the passage between the sealing gasket (5) and the inner wall (6) of the valve body (1) is closed by the action of the first annular lip (5.21) of the sealing gasket (5) that is kept pressed against said wall (6.1) by the action of the first spring (8.1). Tightness in the direction of flow from the first duct (2) to the second duct (2') is thereby ensured.

Preferably, the spring (8.1) is a hollow spring, and even more preferably, with an inner stiffener (11) that prevents it from deforming under pressure of the fluid. The pressure on the first lip (5.21) is thereby maintained against the wall (6.1) of the housing (7).

Fluid leakage due to the deformations that occur in the ball (3), the valve body and the sealing gasket (5) due to the cryogenic temperatures at which it operates is thereby prevented since said leak is avoided by guaranteeing the contact of the sealing gasket (5) with the ball (3) and with the inner wall (6) of the valve body (1), providing a completely tight seal in the flow from the first duct (2) to the second duct (2').

However, as already occurs in known embodiments, the sealing gasket (5) can contact the lower surface of the first chamber (7.1) so that the constant passage of fluid towards the first chamber (7.1) is prevented. To avoid this situation, as can be seen in FIGS. 4, 6, 8 and 9, preferably the first end (5.2) of the sealing gasket (5) comprises at least one inner recess (9.1), and even more preferably four angularly equidistant inner recesses (9.1), which define permanent channels for the continuous passage of fluid from the first duct (2) to the first chamber (7.1) in the area for the passage of fluid between the gasket (5) and the wall (6) of the housing, where said passage will preferably be configured through an inclined projection of the housing (7) and the inclined surface corresponding to the end (5.2) of the gasket (5). Therefore, the first end (5.2) of the sealing gasket exerts contact along its entire circumferential perimeter except in the inner recesses (9.1) for the continuous passage of fluid.

With this arrangement, a continuous passage of fluid to the first chamber (7.1) is allowed so that said fluid exerts additional pressure on the first annular lip (5.21), ensuring to a greater extent the tight seal between the wall (6) and the sealing gasket (5). Likewise, said pressure exerts force in the direction of contact between the sealing gasket (5) and the ball (3), further ensuring the tight seal at said point.

To make the valve a two-way valve while maintaining tightness with a single seat (4), the sealing gasket (5) comprises a second end (5.3) adjacent to the intermediate part (5.1) that fits in a second chamber (7.2).

Figure 5:
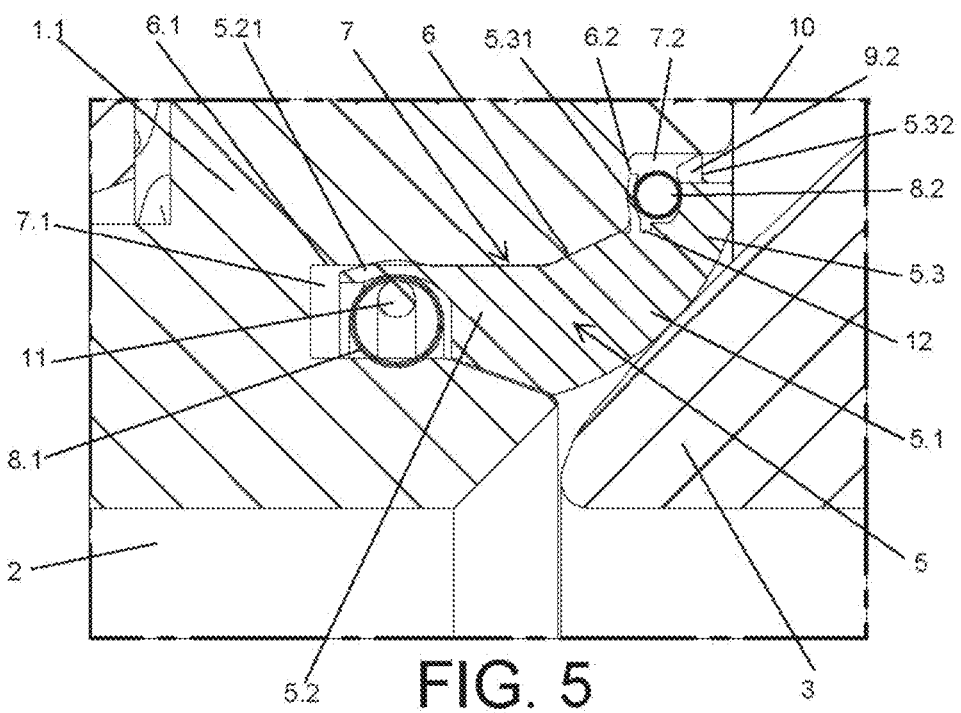
FIG. 5 shows the detail of FIG. 3 enlarged, in the case of a cross section of the gasket through one of the outer recesses of the third annular lip of the gasket.

The second end (5.3) comprises a second annular lip (5.31) projecting longitudinally at an angle with respect to the first annular lip (5.21), preferably perpendicular to each other. Likewise, preferably the second chamber (7.2) is arranged perpendicular to the first chamber (7.1), the second annular lip (5.31) contacting the left side surface of the second chamber (7.2). Said second annular lip (5.31) defines a housing between a third annular lip (5.32) and said second annular lip (5.31) for a second spring (8.2), as can be seen in FIG. 5). Preferably, the second end (5.3) of the gasket (5) has a thickening greater than that of the third lip (5.32) to ensure contact between the wall (6) of the housing and the third lip (5.32).

This second spring (8.2) presses the second annular lip (5.31), causing it to bend against the inner wall (6.2) of the housing (7). As can be seen in FIG. 5), a groove (12) is provided at the base of the second annular lip (5.31) that relieves the stresses sustained at this point due to the bending of the second annular lip (5.31) in addition to facilitating the process for producing the sealing gasket (5).

Thus, in the direction of flow from the second duct (2') to the first duct (2), the fluid leaks through the leak chamber (10) from the second duct (2') to the closing seat (4). In this case, when there are no excessive deformations, the third annular lip (5.32) prevents the passage of fluid towards the second chamber (7.2) by maintaining its contact with the housing (7), specifically with the upper surface of said second chamber (7.2). Therefore, a seal for the passage of fluid is established between the sealing gasket (5) and the inner wall (6) of the valve body (1) which, together with the intermediate part (5.2), prevent the passage of fluid to the first duct (2).

As can be seen in FIGS. 4 and 5, the third annular lip (5.32) has an inclined configuration with a decrease in diameter in the direction of placement of the gasket (5) in the housing (7). This third annular lip (5.32) acts as a mechanical stop that limits the bending of the seat, guaranteeing operation and preventing breakage. In this way, the third annular lip (5.32) facilitates the insertion of the sealing gasket (5) to fit it into the housing (7) without requiring additional mounting elements, and ensures that contact is maintained considering the contraction of the material at cryogenic temperature.

For the pressure of the fluid to reinforce the contact of the second annular lip (5.31) against the inner wall (6.2) of the valve body (1) and the contact of the sealing gasket (5) with the ball (3), as well as that at the first end (5.2) of the gasket (5), the second end (5.3), and more preferably the third annular lip (5.32), comprises at least one outer recess (9.2), as can be seen in FIGS. 5, 6, 7 and 9. Said outer recess (9.2) defines a permanent channel for the continuous passage of fluid towards the second chamber (7.2), so that the pressure of the fluid exerts an additional force on the second annular lip (5.31) against the wall (6).

Additionally, the aforementioned perpendicular arrangement between chambers (7.1, 7.2) and annular lips (5.21 and 5.31) allows the pressure exerted by the fluid against the sealing gasket (5) to have resultant forces directed towards contact with the ball (3), reinforcing the tightness of the ball valve assembly.

In this way, the hermetic seal is ensured in the direction of fluid flow from right to left. Therefore, for two-way ball valves of this type in cryogenic temperature conditions, only one closing seat (4) in one of the mouths of the ducts (2, 2'), and not one gasket for each mouth as in the known embodiments, will be necessary, resulting in a cavity-free ball valve, that is, a valve body (1) free of dead spaces where fluid can accumulate and create overpressure.

According to one design option, the housing (7) can be made on the valve body (1) or, as can be seen in FIGS. 2 and 3, the closing seat (4) can be comprised in a seat insert (1.1) of the valve body (1), where the valve body (1) may be made up of two parts, one for each mouth, but there will always be a closing seat (4) such as the one described at the contact with the ball (3). This configuration allows for a simpler manufacturing of the seat since the housing (7) would be machined in the seat insert (1.1) itself and not directly on the valve body (1). In addition, it would allow its replacement in the case of deterioration or failure.

As can be seen in FIG. 9, the inner recesses (9.1) and outer recesses (9.2) are preferably in angularly interspersed positions in the axial direction with respect to the sealing gasket. This configuration distributes the fluid pressure to ensure a better hermetic seal.

Figure 10:
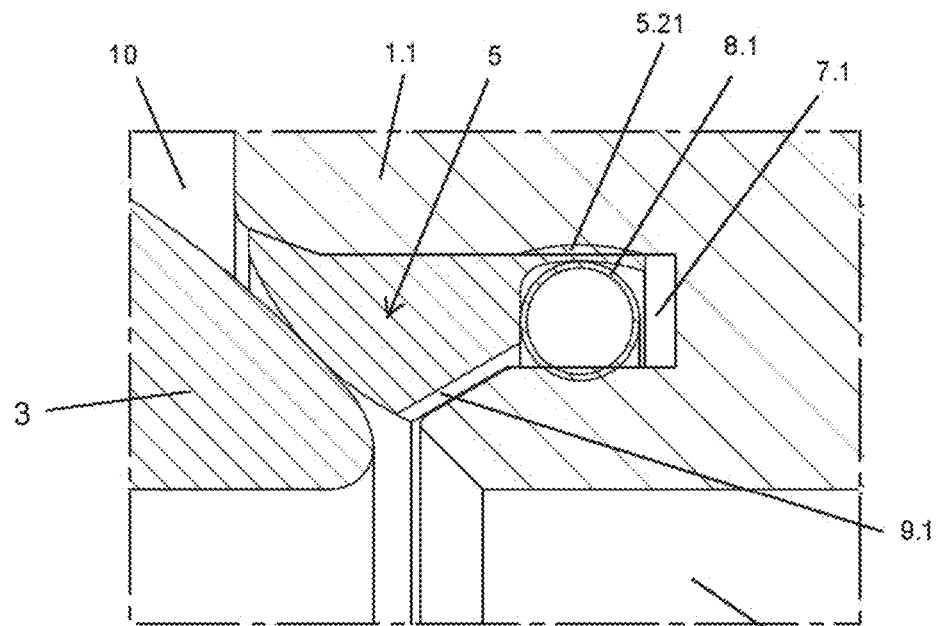
FIG. 10 shows an enlarged detail of a second seat for the case in which a seat is included in both contacts of the body with the ball, said second seat being configured according to the embodiment known in the prior art.
Figure 11:
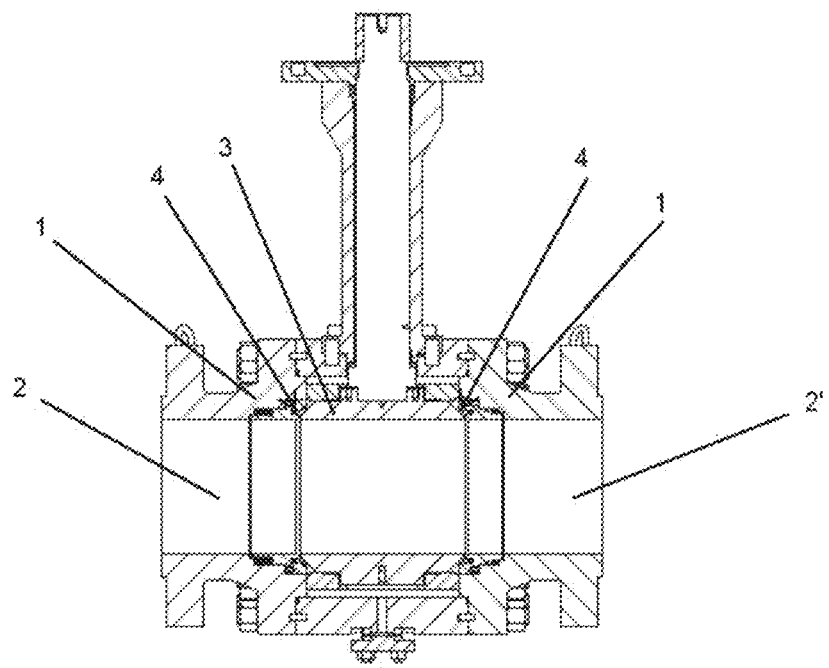
FIG. 11 shows a front section view of the valve where closing seats can be seen in both mouths of the ball valve.

Additionally, as can be seen in FIG. 11, in an alternative embodiment, a closing seat like the one used in the state of the art, such as the one shown in FIG. 10, is intended to be included in the second mouth so that the closing seat (4) object of the invention would be arranged in the left mouth of the first duct (2) and the simple seat of FIG. 10 would be arranged in the right mouth of the second duct (2'). A redundant seal is thereby provided in the valve in one of the directions. Normally to achieve this redundant seal in installations, it is necessary to mount two valves in series; however, with this configuration the need for a complete additional valve is eliminated.

Alternatively, it would also be possible to mount a closing seat (4) as claimed in both mouths, so that the safety of the installation is increased. In this case, a mechanism to release the pressure from the inner cavity of the valve body is intended to be included, since during the opening and closing operation of the valve, fluid may remain in the chamber (10) and it is necessary to release pressure should overpressure occur.

The invention claimed is:

1. A two-way ball valve with a cryogenic seat, comprising:
   a valve body (1) with a first fluid inlet duct (2) and a second fluid outlet duct (2'),
   a ball (3) with a through hole (3.1) arranged in an inner cavity of the valve body (1) between the inlet and outlet ducts (2, 2'), the ball (3) configured to rotate between a position connecting the through hole (3.1) to the inlet and outlet ducts (2, 2') and a position which wherein it interrupts the passage between said inlet and outlet ducts (2),
   a closing seat (4) arranged in the inlet duct (2) and/or in the outlet duct (2'), comprising a sealing gasket (5) inserted in a housing (7) defined in a wall (6) of the inner cavity where the ball (3) is arranged, the sealing gasket (5) comprising,
   an intermediate part (5.1) projecting from the housing (7) and contacting the ball (3) to close the passage of fluid through the contact between the sealing gasket (5) and the ball (3);
   a first end (5.2) that defines a first chamber (7.1) of the housing (7) between the wall (6) and said first end (5.2), where there is arranged a first spring (8.1) of the closing seat (4) that presses a first annular lip (5.21) of the first end (5.2) of the sealing gasket (5) against the wall (6) to close the passage of fluid at the contact between the gasket (5) and the wall (6), establishing a passage of fluid from the inlet duct (2) to the first chamber (7.1) only between the wall (6) of the inner cavity of the valve body (1) and the sealing gasket (5),
wherein the sealing gasket (5) comprises a second end (5.3) that defines a second chamber (7.2) of the housing (7), between the wall (6) and said second end (5.3) where there is arranged a second spring (8.2) of the closing seat (4) that presses a second annular lip (5.31) of the second end (5.3) of the sealing gasket (5) against the wall (6) so that the passage of fluid is closed at the contact between the gasket (5) and the wall (6), establishing a passage of fluid from the outlet duct (2') to the second chamber (7.2) only between the wall (6) of the inner cavity of the valve body (1) and the sealing gasket (5).

2. The two-way ball valve with a cryogenic seat according to claim 1, wherein the first annular lip (5.21) is arranged in the direction of the first duct (2) and the second annular lip (5.31) is arranged at an angle with respect to said first annular lip (5.21).

3. The two-way ball valve with a cryogenic seat according to claim 1, wherein the first end (5.2) comprises at least one inner recess (9.1) transverse to the gasket (5) that defines a permanent channel for the passage of fluid from the first duct (2) to the first chamber (7.1) when the first end (5.2) contacts the wall of the housing (7) in an area for the passage of fluid.

4. The two-way ball valve with a cryogenic seat according to claim 1, wherein the second end (5.3) comprises at least one outer recess (9.2) transverse to the gasket (5) that defines a permanent channel for the passage of fluid from the outlet duct (2') to the second chamber (7.2).

5. The two-way ball valve with a cryogenic seat according to claim 1, wherein the second end (5.3) comprises a third annular lip (5.32) that contacts the wall (6) and, together with the second annular lip (5.31), delimits a housing for the second spring (8.2).

6. The two-way ball valve with a cryogenic seat according to claim 5, comprising a plurality of inner recesses (9.1) and/or a plurality of outer recesses (9.2) angularly equidistant from one another.

7. The two-way ball valve with a cryogenic seat according to claim 6, wherein the inner recesses (9.1) are arranged in angularly interspersed positions with respect to the outer recesses (9.2) in the axial direction with respect to the sealing gasket (5).

* * * * *